Sept. 25, 1923.
J. Y. KING
SHOCK ABSORBING SPRING
Filed April 27, 1921
1,468,907
Fig. 1.
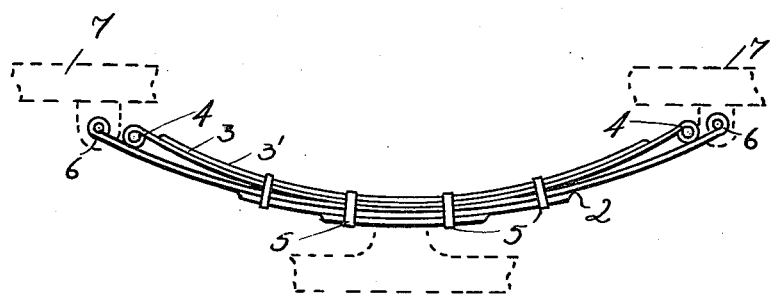
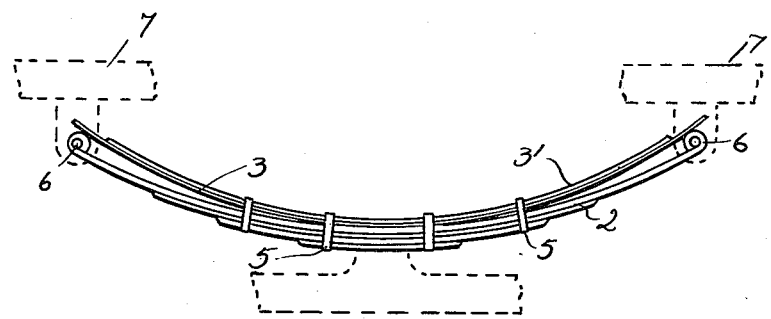
Fig. 2.
INVENTOR
John Y. King
By W. W. Williamson Atty.

Patented Sept. 25, 1923.

1,468,907

UNITED STATES PATENT OFFICE.

JOHN Y. KING, OF LANSDOWNE, PENNSYLVANIA.

SHOCK-ABSORBING SPRING.

Application filed April 27, 1921. Serial No. 464,874.

*To all whom it may concern:*

Be it known that I, JOHN Y. KING, a citizen of the United States, residing at Lansdowne, in the county of Delaware and State of Pennsylvania, have invented new and useful Improvements in Shock-Absorbing Springs, of which the following is a specification.

My invention relates to new and useful improvements in shock absorbing springs, and more particularly to improvements on such a spring shown and claimed in my Patent Number 1,393,140, Oct. 11, 1921, and has for its object to provide a semi-elliptic leaf spring comprising a plurality of leaves one or more of the outermost ones of which are spaced from their adjacent leaf throughout a portion of their length, one of said spaced leaves having an integral projection, preferably in the form of an eye or enlargement, adapted to bear directly against its adjacent leaf.

Another object of the invention is to provide a semi-elliptic leaf spring one of the outermost leaves of which is spaced from its adjacent leaf and one of said leaves having integral means for direct contact with its adjacent leaf to hold the outermost leaf in spaced relation.

A further object of the invention is to provide a spring of the character stated, the uppermost leaf or leaves of which are separated from the adjacent leaf throughout a portion of their length one of which is in contact with said adjacent leaf at its ends so as to absorb the shock incident to the rebound of the spring.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a side elevation of my improved shock absorbing spring.

Fig. 2, is a similar view of a slightly modified form thereof.

In carrying out my invention as here embodied, 2 represent a semi-elliptic or bow spring consisting of a series or plurality of leaves one or more of the outermost of said leaves preferably the uppermost ones, designated by the numerals 3 and 3' are spaced from the adjacent leaf throughout a portion of their length and as shown in Fig. 1 one of these spaced leaves is provided at its ends with integral projections 4 in the form of enlargements or eyes so as to bear directly against the adjacent leaf, all of the leaves being fastened together at their central portions by means of clips 5 and one of the other leaves, as said adjacent leaf, is provided with an eye 6 at each end in which the vehicle body 7, represented by dotted lines, is supported.

The leaves 3 and 3' are so formed or tensioned as to act in opposition to the main leaves of the spring to produce unstaple equilibrium in order to absorb the shock incident to the rebound of the main spring leaves.

As shown in Fig. 2, the spring leaf 3 may be made without the enlargements 4 and the ends of said leaf permitted to extend over and bear against the eyes 6 which will accomplish the same result.

From the foregoing it will be noted that one of the uppermost leaves of the spring bears against the adjacent leaf at two or more separated points, while said leaves are spaced apart between said contact points or in other words one of the leaves is separated from its adjacent leaf throughout a portion of its length and either of said leaves is provided with an integral enlargement to bear directly against the coacting leaf and hold said leaves in spaced relation the desired distance.

Where two leaves are separated from the load supporting spring leaves to form the shock absorber the leaf 3' is preferably made shorter than the leaf 3 and acts as a strengthener for the leaf 3 where the device is to be used on large or heavy vehicles or ones designed to carry heavy loads.

Of course I do not wish to be limited to the exact details of construction as herein shown as these may be varied within the limits of the appended claims without departing from the spirit of my invention.

Having thus fully described my invention, what I claim as new and useful is:—

1. A semi-elliptic leaf spring comprising a plurality of leaves, the uppermost of said leaves being unattached and spaced from the adjacent leaf a portion of its length, said leaf being provided with an integral enlargement bearing directly against said adjacent leaf.

2. A semi-elliptic leaf spring comprising a plurality of leaves, the uppermost of said leaves being unattached and spaced from the adjacent leaf a portion of its length, said leaf being provided with an integral enlargement bearing directly against said adjacent leaf a short distance from the end of said leaf.

3. A semi-elliptic leaf spring comprising a plurality of leaves, one of the outermost of said leaves being unattached and spaced from the adjacent leaf a portion of its length, and opposed to the other leaves and an integral enlargement formed with one of said leaves and bearing directly against the other of said leaves.

4. A semi-elliptic spring comprising a plurality of leaves, certain of the outermost leaves being unattached and spaced from the adjacent leaf a portion of their length, and opposed to the other leaves and an integral extension formed with the end of one of said spaced leaves and bearing directly against said adjacent leaf.

5. A semi-elliptic spring comprising a plurality of leaves, the leaf next the outermost one being spaced from the adjacent leaf a portion of its length, and opposed to the other leaves said leaf being provided with an integral extension bearing directly against said adjacent leaf, and the outermost leaf in direct contact with the spaced leaf throughout its entire length.

6. A semi-elliptic leaf spring comprising a plurality of leaves, the uppermost of said leaves being spaced from the adjacent leaf a portion of its length and opposed to the other leaves, said leaf having its outer end slidably bearing against said adjacent leaf.

7. A semi-elliptic leaf spring comprising a plurality of leaves, one of the outermost of said leaves being spaced from the adjacent leaf a portion of its length and opposed to the other leaves, said leaf having its outer end slidably bearing against the adjacent leaf.

8. A semi-elliptic leaf spring comprising a plurality of leaves, one of the outermost of said leaves being spaced from the adjacent leaf a portion of its length and opposed to the other leaves and an integral enlargement formed with one of said leaves and slidably bearing against the other of said leaves.

9. A semi-elliptic leaf spring comprising a plurality of leaves, one of the outermost leaves being opposed to the other leaves attached to the others at only one point and being in sliding contact at another separated point, said outermost leaf being spaced from the other leaves intermediate said points.

In testimony whereof, I have hereunto affixed my signature.

JOHN Y. KING.